UNITED STATES PATENT OFFICE.

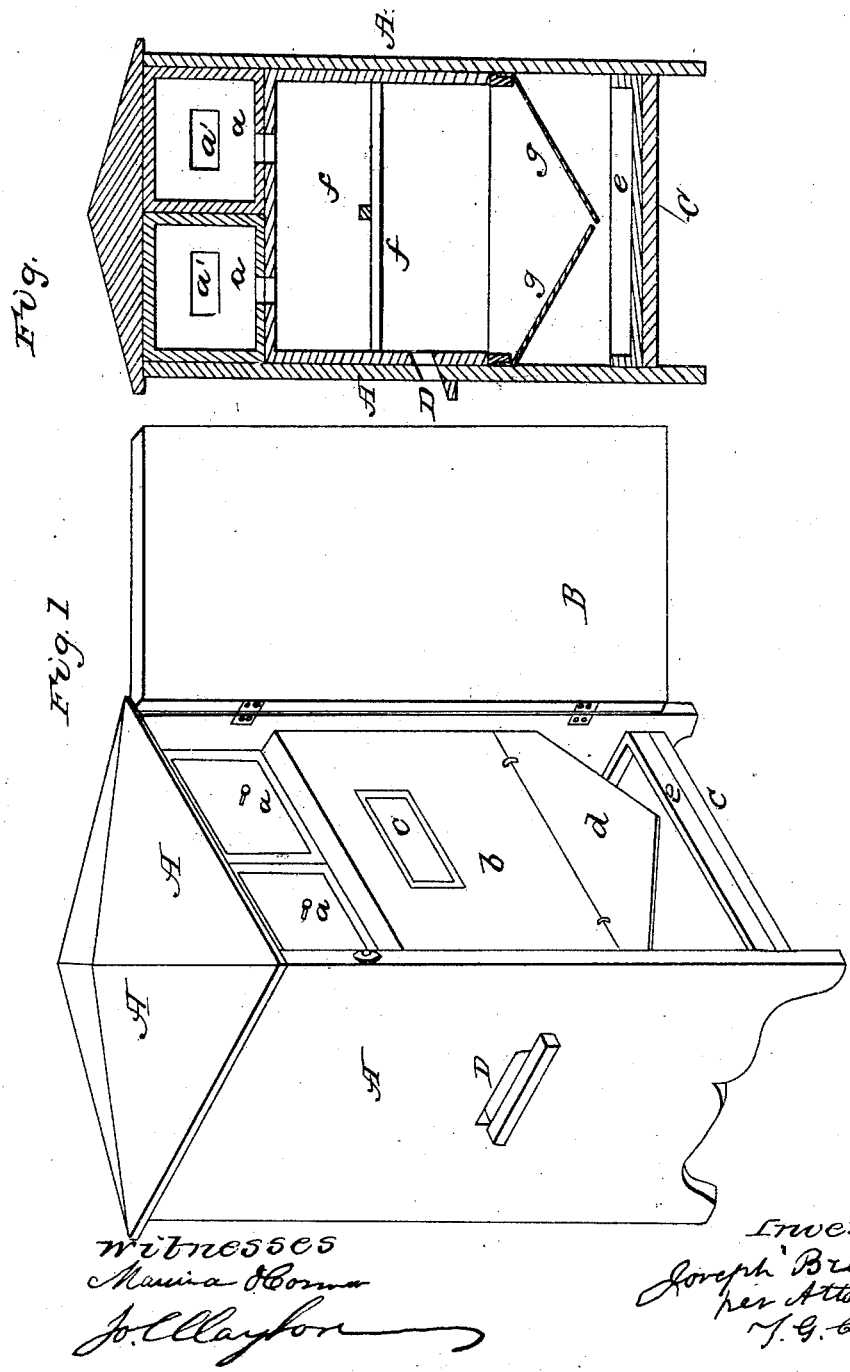

JOSEPH BRADT, OF LA PORTE, INDIANA.

IMPROVEMENT IN BEE-HIVES.

Specification forming part of Letters Patent No. 36,938, dated November 18, 1862.

*To all whom it may concern:*

Be it known that I, JOSEPH BRADT, of La Porte, in the county of La Porte, and in the State of Indiana, have invented a new and useful Improvement in Bee-Hives; and I do hereby declare that the following is a full and exact description thereof, reference being had to the accompanying drawings, and to the letters of reference marked thereon, in which—

Figure 1 is a perspective view of the hive with the door open. Fig. 2 is a vertical section through the center of the hive.

To enable others skilled in the art to make and use my invention, I will describe its construction and operation.

In the construction of my invention, in Figure 1 A is the hive; B, the door; C, the bottom; D, the aperture for the entrance of the bees, with a ledge attached on which the bees alight; $a$, the honey-boxes, which rest upon the main hive or bee-box. The boxes $a$ are constructed with opening, s which correspond with the openings of the main box, which allow the bees to pass up through for the purpose of depositing the spare honey for table use, and when filled they can be removed and others set in their place. By means of the glass in these boxes it can be seen when they are filled sufficiently to remove.

$b$ is the main hive or bee-box. This box has two cross-pieces in it for the bees to build to, and are not connected in any way to the point where the bees enter the hive, but they have to fly from the aperture to the point where they make their deposits of wax and honey. By this arrangement I deprive the moth from laying its eggs in contact with the comb of the bees, and thus get clear of this great annoyance to bees.

$c$ is a glass to see into the main hive, and to see the working of the bees; $d$, the swinging flap which corresponds with the shape of the projections to the bottom of the main hive or bee-box. This flap or door is hung on hinges, so as to raise or lower, as required; $e$, the drawer, which is below the main box, into which all dirt or filth falls, and which is easily removed by withdrawing the slide or drawer and emptying all extraneous matter out of it.

In Fig. 2 the same letters designate the same parts, and, in addition, $f$ is the cross-piece inside of box $b$; $g$, the inclined projecting bottoms, which are to receive on each side all extraneous matter falling from the hive, and cause it to descend these inclined sides and discharge into box or drawer $e$. The box or drawer is then withdrawn and emptied.

In the operation it will be seen that the entrance to the main hive is so constructed and located that the bees enter and fly to the cross-bars $f$, where the comb is attached, and as the hive is filled with comb and honey the bees then work up to the top boxes, $a$, and deposit the surplus honey, which can be removed at pleasure. By this arrangement the bees do not crawl from the point of entrance to the place of deposit, but fly; consequently the moth cannot have any place to deposit their eggs, and therefore cannot annoy or destroy the bees. There is no bottom to the main hive, but the two inclined metallic pieces, $g$. These, with the flap $d$, serve as a bottom and portion of the front side, thus inclosing the hive, and by their adjustability and inclination allow all extraneous matter to fall down into the drawer, and also allow the apiarian to see into the hive when the flap is raised. This arrangement of the hive $b$ with inclined bottom sides, $z$, and flap $d$, is for practical use an important one, as I have found, as I keep the hive clean and clear of all extraneous substances, and prevent moth or bee flies from annoying the bees.

Having thus described my invention, what I claim as new, and desire to secure by Letters Patent, is—

The construction of the hive or main box $b$ with bars $f$, flap $d$, and inclined bottoms $g$, arranged and operating with the entrance D, box A, honey-boxes $a$, and drawer $e$, as set forth and described.

JOSEPH BRADT.

Witnesses:
ELNATHAN GREGORY,
RICHARD HOLMES.